| A<br>Positional identification of lines in raster | B<br>Temporal scanning and color<br>1st Field | C<br>sequence of of lines in frame of presentation.<br>2d Field |
|---|---|---|
| 1 and 2d ½ of 525 | 1, R | 2d ½ of 263, G |
| 2 | | 264, B |
| 3 | 2, G | |
| 4 | | 265, R |
| 5 | 3, B | |
| 6 | | 266, G |
| | | |
| | | |
| 521 | 261, B | |
| 522 | | 524, G |
| 523 | 262, R | |
| 524 | | 525, B |
| 1st ½ of 525 | 1st ½ of 263, G | |
| | | |

| | | |
|---|---|---|
| 1 and 525 | 1, R | 2d ½ of 263, B |
| 2 | | 264, G |
| 3 | 2, G | |
| 4 | | 265, R |
| 5 | 3, B | |
| 6 | | 266, G |
| 7 | 4, G | |
| 8 | | 267, B |
| 9 | 5, R | |
| 10 | | 268, G |
| | | |
| | | |
| 519 | 260, G | |
| 520 | | 523, B |
| 521 | 261, R | |
| 522 | | 524, G |
| 523 | 262, G | |
| 524 | | 525, R |
| 525 | 1st ½ of 263, B | |
| | | |

INVENTOR
Paul Raibourn
BY Pennie, Edmonds, Morton, Barrows + Taylor
ATTORNEYS

May 15, 1962 P. RAIBOURN 3,035,116

COLOR TELEVISION

Filed Jan. 23, 1956 4 Sheets-Sheet 2

INVENTOR
Paul Raibourn
BY
Pennie, Edmonds, Morton, Barrows & Taylor
ATTORNEYS

INVENTOR
Paul Raibourn
BY
Pennie, Edmonds, Morton, Barrows & Taylor
ATTORNEYS

INVENTOR
Paul Raibourn
BY Pennie, Edmonds, Morton, Barrows & Taylor
ATTORNEYS

United States Patent Office 3,035,116

Patented May 15, 1962

3,035,116
COLOR TELEVISION

Paul Raibourn, Southport, Conn. (% Chromatic Television Lab., Inc., Paramount Bldg., Times Square, New York, N.Y.)

Filed Jan. 23, 1956, Ser. No. 560,507
1 Claim. (Cl. 178—5.4)

This invention relates to television in natural colors. The invention provides a television system either for the reception and display of color subcarrier-type color television signals of the type now approved for use in the United States, or for the transmission, reception and display of a simplified form of signal. The invention achieves in either event substantial simplification of the apparatus at the receiving station over that now widely proposed to be used, and, in the latter event, substantial simplification of the apparatus at the transmitting station.

With respect to display devices at the receiving station, the invention (although not limited thereto) is of particular advantage when used with display devices in which information can be presented at any one time in only one of the primary colors of the additive system of color reproduction employed. Cathode-ray picture tubes for color television of the type including a single electron gun which must be time-shared among the primary colors are an example of such display devices, and color television receivers employing such tubes may incorporate important simplifications of design, construction and maintenance by comparison with receivers employing three-gun picture tubes. For example, achievement and maintenance over the entire raster area of proper convergence among the three electron beams of three-gun tubes has proved extremely difficult.

Heretofore difficulty has been experienced in one-gun tubes in sharing the beam among the primary colors in an efficient manner, i.e. at a high duty cycle, so that the beam may be effectively presenting picture information on the fluorescent screen of the tube for a high percentage of the time. In one of its aspects the present invention provides a method and apparatus whereby such a high duty cycle may be achieved, together with a very desirable simplification of the associated receiver circuits, in displaying the color television signals of the color subcarrier type. According to another aspect of the invention these advantages, together with further important simplifications of the receiver, are attained by the use of a different form of transmitted signal generated in a transmitter according to the invention, so that in this latter aspect the invention provides a complete system of color television.

At the time of filing of this application the system of color television approved in the United States is that known as the NTSC system. This designation refers to a signal standard for a color television signal of the color subcarrier type which was approved by the FCC in December 1953. In describing those aspects of the invention pertaining to the reception and display of color television signals of the color subcarrier type reference will often be made herein to the NTSC signal although even in regard to those aspects alone the invention is applicable to the display of color television signals of the color subcarrier type generally.

The chrominance component of the NTSC signal takes the form of two amplitude modulations of a pair of subcarrier waves which are in quadrature, the subcarriers themselves being suppressed. These two amplitude modulations are sometimes described as constituting a combined amplitude and phase modulation of a single subcarrier, the amplitude modulation corresponding to the saturation of the colors in the portion of the scene instantaneously scanned while the phase modulation corresponds to the hue thereof. Accordingly, information corresponding to all hues is made available within the period of each subcarrier cycle, and in the receiving equipment for display of the NTSC signal which has been heretofore proposed, apparatus is provided for successively exciting in a picture tube phosphor areas luminescent in the three primary colors of the system within each such subcarrier cycle, the subcarrier cycle having a duration of approximately 1/3.58 mc.

The difficulty hitherto experienced in achieving a high duty cycle with one-gun tubes in displaying the NTSC and similar signals has been due at least in part to the shortness of this cycle over which the gun has been shared among channels containing information proper to the three primary colors of the system, the electron beam being synchronously switched to impact phosphor areas on the tube face luminescent in those three colors.

According to the present invention instead the gun is cyclically shared among the three colors over a cycle which is a multiple of the time required to scan one line in the raster. Each line of each frame is allotted to a single color so that during the scanning of a complete line information is presented in a single color only. In a preferred embodiment of the invention each line of the raster is so allotted to the same color in all frames, the cycle just mentioned including a number of line scanning periods which is an integral factor in the number of lines contained in the frame. By this method line crawl is prevented from appearing in the reproduced picture.

Resolution in the reproduced picture does not materially suffer from this form of presentation; in practice it may be improved even over that which has hitherto been obtained in three-gun tubes. All lines of the raster display the fine detail due to the contributions to luminance of all three primary colors in the scene being televised, and the separation vertically of areas, i.e. lines, of the same color is not so great as to be troublesome in view of the inability of the eye to detect color differences as distinguished from brightness differences within small areas.

According to another form of the invention a color change cycle may be employed whose length in line scanning periods is not an integral factor of the number of lines contained in the frame. In this form of the invention line crawl is minimized by including in the cycle twice as many green as red lines and by reducing the luminance value of the green lines by a fractor of one-half in order to reduce so far as practicable the differences in luminance among the lines of the complete raster and hence the tendency of the eye to follow the shifting position of lines of the greatest luminance.

According to a further form of the invention the cycle of color change includes a number of line scanning periods which is not an integral factor of the total number of lines per frame, but each positional line of the raster is presented in the same color on all frames by the use of means which cause the first line of each frame and hence the first positional line in the raster always to be scanned in the same color. In this form of the invention also the number of green lines in the color cycle may be made twice as great as the number of red lines.

Further in accordance with the invention, the appearance of horizontal line structure in the reproduced picture is minimized, without loss of horizontal resolution, by an effective increase in the width of the scanned lines which is produced by the application of a supplementary deflection of low amplitude, transverse to the direction of line scan, at a rate which is high compared to the line scanning frequency.

According to a further aspect of the invention the development, over the duration of one line scan, of low frequency information in one color and high frequency information in a weighted sum of all primary colors, is advanced from the receiver to the transmitter to provide a television system in which the transmitted signal comprises a carrier modulated with high frequency components representative of the total luminance in the scene televised and, throughout the scanning of any one line, further modulated with low frequency components representative of the luminance of one primary color only.

The invention will now be described in further detail with reference to the accompanying drawings in which.

Figure 1:
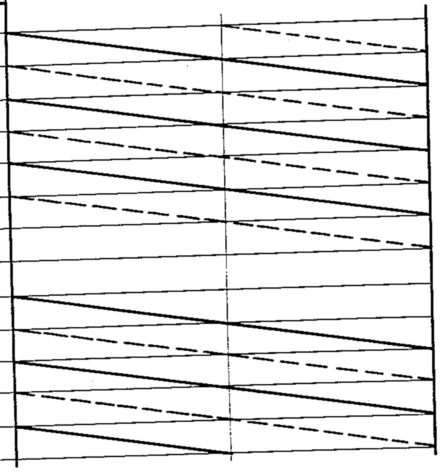
FIG. 1 is a diagram illustrating one scanning and color presentation sequence according to the invention.

In one of its aspects the invention contemplates the reception and display of color television signals of the color subcarrier type now approved in the United States. The scanning of the raster is therefore performed, in receivers constructed and operated according to the invention, in frames of 525 lines scanned in two interlaced fields at a field frequency of 60 or substantially 60 c.p.s. In FIG. 1 the odd numbered lines of the raster which belong to the first field of each frame are shown in full lines while the even numbered lines belonging to the second field are shown in dashed lines. Column A in FIG. 1 identifies the various lines of the raster by number from 1 to 525. Columns B and C indicate the temporal sequence in which the various lines of the raster are scanned in the interlaced pattern just mentioned.

According to the invention, as applied to receivers including one-gun picture tubes, the single gun of the picture tube is energized during the scanning (more exactly during the trace as distinguished from retrace) of each line with a composite signal which represents, as to low video frequencies, the contribution to luminance in the subject matter scanned of a single one of the primary colors, the beam being synchronously deflected not only according to the scanning pattern of FIG. 1 but supplementarily to impact during the scanning of such a line only phosphor areas on the display screen of the tube which are luminescent in that color. As to higher video frequencies on the other hand the beam is during the scanning of all lines modulated in accordance with the aggregate contributions of all primary colors to the luminance of the scanned scene. The individual colors thus associated with temporally successively scanned lines are changed from line to line in a cycle which includes all colors at least once. The color change cycle is therefore an integral multiple of the line scanning period and, for a three-color system, not less than three times the line scanning period.

According to the particular method of presentation indicated in FIG. 1 the color change cycle includes all colors once, taken in any order. The order shown is red, green, blue (hereinafter RGB). The cycle is hence three lines long, and since three is an integral factor of 525 the frame contains an integral number of color change cycles. Consequently the first line in each frame is always presented in the same color, and every positional line in the raster is presented in one color only. The letters R, G, B in columns B and C of FIG. 1 indicate the colors in which the lines of the raster are presented.

Figure 2:
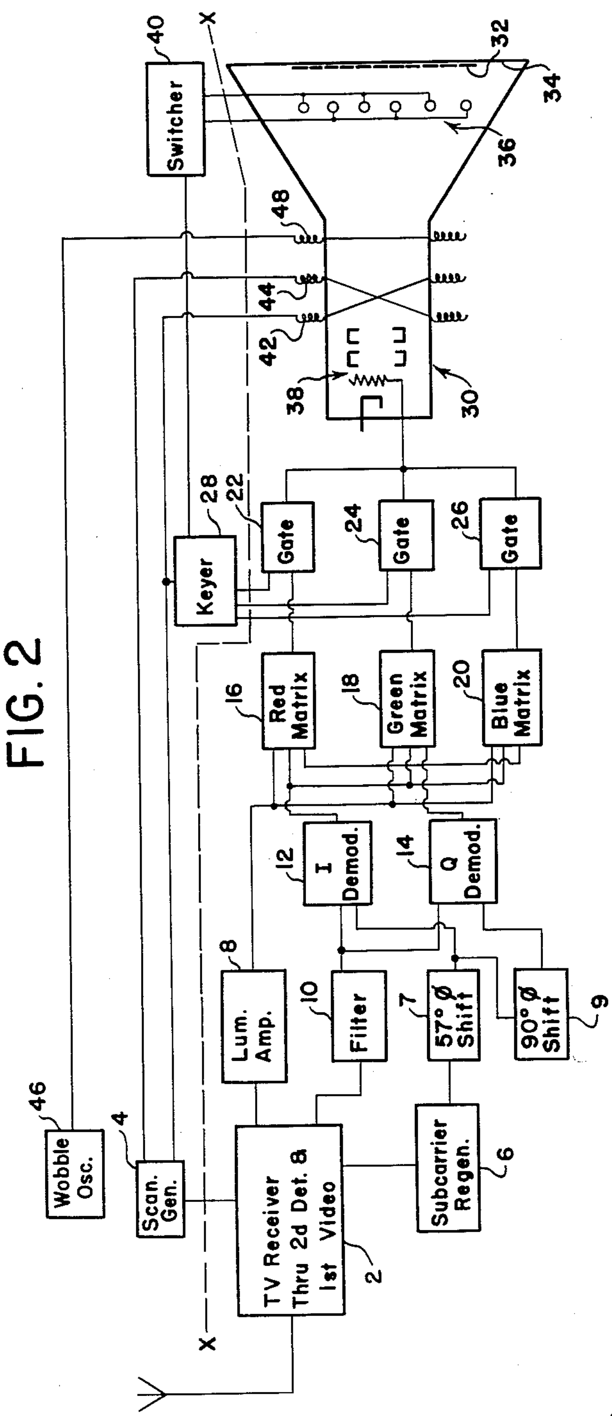
FIG. 2 is a block diagram of a television receiver according to the invention adapted to the reception of color television signals of the color subcarrier type (specifically the NTSC signal) and to display thereof, for example as diagrammed in FIG. 1.

FIG. 2 illustrates, in block diagram form, a receiver suitable for practice of the invention according to the pattern of FIG. 1.

In FIG. 2 a unit 2 includes the elements necessary to perform the functions of R.F. amplification, conversion to a first intermediate frequency, I.F. amplification, second detection and, usually, a first stage of video amplification. The signal at the output of this first video amplifier, which may be taken to constitute the last stage in unit 2, is the complete NTSC color video signal. As such it comprises a luminance signal of picture video frequencies from 0 to 4 megacycles, horizontal and vertical synchronizing signals, color subcarrier synchronizing signals, and chrominance information in the form of two sets of side bands on a suppressed color subcarrier—the so-called I and Q moduations. This complete signal is advantageously made available in opposite polarities on the plate and cathode of the first video amplifier stage above referred to.

The complete video signal just described is supplied by unit 2 to a plurality of units for performance of the necessary functions in reproduction of the color signal. It is supplied, advantageously from the plate of the first video stage at the output of unit 2, to a luminance amplifier and delay unit 8, to an AGC, sync separator and scanning signal generating unit 4 and to a subcarrier regenerator unit 6. It is also supplied, from the cathode of the said first video stage, to a band pass amplifier 10 at the input of the chrominance circuits. The output of unit 10 comprising video frequencies from approximately 2 to 4 megacycles is fed to I and Q demodulator units 12 and 14, which are also supplied with the regenerated subcarrier signal developed in unit 6. The regenerated subcarrier undergoes appropriate phase shift in phase shifters 7 and 9 in order to appear in the I and Q demodulator units in quadrature relationship properly phased with respect to the color subcarrier phase.

The I and Q demodulators recover from the two sets of chrominance modulation side bands the I and Q signals which were applied as separate modulations to the subcarrier in the development of the complete signal at the transmitter. At the output of the I and Q demodulators there are provided 0–1.6 mc. and 0–0.5 mc. low pass filters respectively. The I and Q signals are applied together with the 0–4 mc. luminance signal, denoted Y, to red, green and blue matrix units 16, 18 and 20. All three signals are there combined in suitable proportions, different in each matrix, to create red, green and blue color voltages.

Thus far the receiver of FIG. 2 may be similar to those which have already been described in the literature. See for example Terman, Electronic and Radio Engineering, 1955, pages 999 et seq. As such the receiver of FIG. 2 develops at the output of units 16, 18 and 20 three simultaneous signal voltages representative, respectively, as to low frequencies, of the red, green and blue luminance in the scene being scanned and all representative as to higher frequencies of the total luminance thereof. According to the invention however these signals, instead of being applied continuously to the three guns of a three-gun picture tube or sampled at subcarrier rate for modulation of the single cathode-ray beam in a one-gun tube, are sampled successively for periods each amounting to the time required to scan a single line in the raster produced on the screen of the picture tube 30 by the scanning voltages of unit 4. To this end the outputs of the matrix units 16, 18 and 20 are fed respectively to three gating units 22, 24 and 26. These are energized with square wave voltages, cyclical with the color change cycle, which are developed in a keying section 28 whose operation is synchronized from the scanning generator 4.

FIG. 2 illustrates application of the invention to display of color television signals on a one-gun picture tube 30 of the post deflection focusing grid switching type of tube disclosed in Patent No. 2,692,532. In this tube the phosphors luminescent in the red, green and blue primaries are arranged in narrow parallel strips 32 disposed in a repeating cycle, for example red, green, blue, green, red, green, blue, green, etc. These strips are arranged on the end face 34 of the tube or on a mounting plate within the tube to extend perpendicularly to the plane of the figure as the tube is there shown. A grid of wires 36 is supported within the tube between the strips and the electron gun which is generally indicated at 38, close to and substantially parallel to the length of the strips. One wire is electron optically centered in front of each red and blue strip. The wires in front of the red strips are electrically connected together and the wires in front of the blue strips are electrically connected together, so that voltages may be applied between the two sets of wires by means of a color switching unit 40. The color switching unit 40 is also controlled from the keyer 28 to develop between the two sets of grid wires a step-shaped voltage, the cycle of which is equal in duration to the color change cycle.

Horizontal and vertical scanning coils 42 and 44 are associated with the tube to cause the beam to trace out a raster in the usual fashion, i.e. substantially thirty frames per second of 525 lines each in two interlaced fields, by means of voltages developed in the generator 4.

The outputs of the three gates 22, 24 and 26 are connected in parallel to an intensity controlling electrode in the gun, and the three gates are so adjusted that with a common video signal applied to the signal input of all three a white or gray raster is produced on the screen of the picture tube 30.

Figure 5:
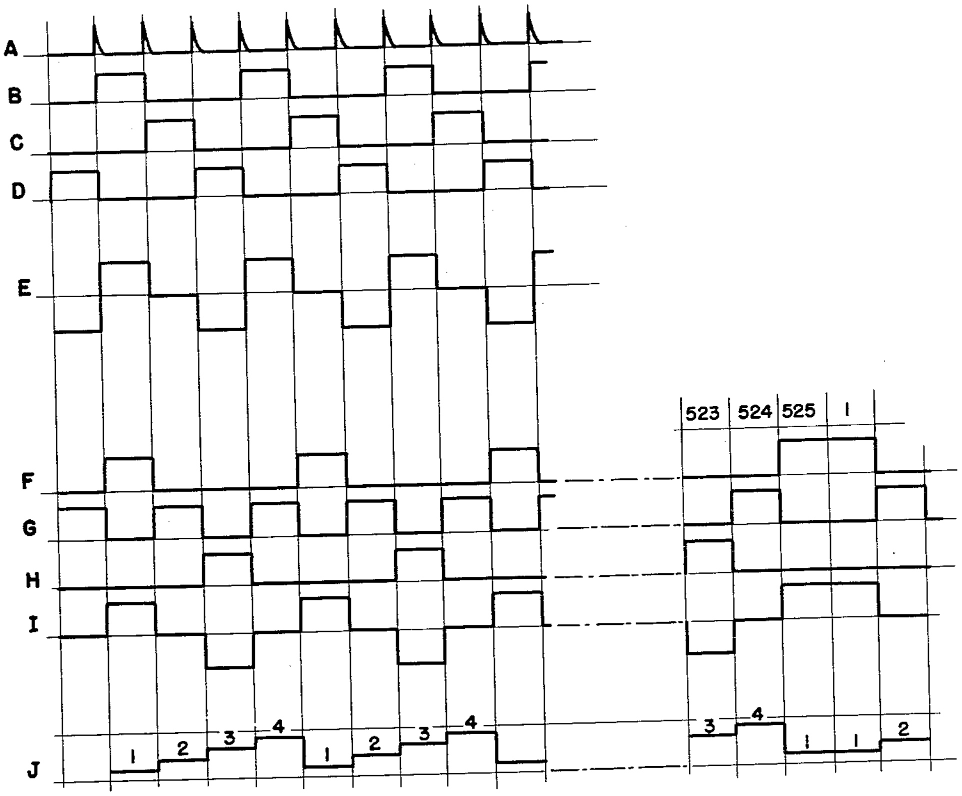
FIG. 5 is a series of waveforms useful in explaining the invention.

FIG. 5 illustrates operation according to the invention of the receiver of FIG. 2, with the color change cycle or color sequence of FIG. 1, namely a cycle three line periods long with one line allotted to red, one to blue and one to green.

In FIG. 5 waveform A represents pulses at line frequency, the first pulse shown being assumed to occur at the start of the trace of the first line in the first field of a frame. The pulses of waveform A may be developed in the keyer 28 from the horizontal scanning voltage. From these pulses the keyer develops three square wave voltages shown at waveforms B, C and D, each having a period three lines long and successively displaced in phase by the duration of the one line scan. Waveform B is applied to gate 22, waveform C to gate 24 and waveform D to gate 26, the positive-going portions of these waveforms opening the gates to which they are applied.

During the scanning of the first line represented in FIG. 5 the picture tube 30 evidently receives red information from matrix 16. During the scanning of the second line the picture tube receives green information from matrix 18, and so on, information in all colors being displayed within a time cycle having a length equal to the time of scanning three lines.

Synchronously with the connection of red matrix 18 to the tube, the electron beam is deflected, supplementarily to its frame and line scannings by coils 42 and 44, to impact only the red among the phosphor strips 32. This supplementary deflection is effected by means of a step voltage one line long developed in a switching unit 40. This step voltage makes the wires of grid 36 in front of the red strips positive with respect to those in front of the blue strips. During the scanning of the second line of the field, the electrons must be directed to the green strips, which are midway between the wires of grid 36, and during the scanning of the third line they must be directed to the blue strips. Accordingly the voltage applied by the switcher 40 between the two sets of wires possesses the shape of waveform E in FIG. 5, a proper time relation between the switching waveform E and the gating waveforms B, C and D being preserved by a connection between the keyer 28 and switcher 40.

The nature of the signals applied by gates 22, 24 and 26 to the intensity modulating electrode of the tube 30 may here be considered to advantage. These signals are not the same as the voltages produced at the transmitting station by the color selective cameras. Rather they are in each case a composite of low frequency components attributable (e.g. in the case of gate 22) to variations in the amount of red in the scene being televised and of high frequency components attributable to the variations in total luminance of the scene. This make-up is the result of the addition in the matrices of the luminance signal Y from amplifier unit 8 having in practice a band width extending essentially from zero to 4 mc. and the band-limited chromaticity components recovered in the I and Q demodulators. More particularly the matrices 16, 18 and 20 may be considered as generating from the demodulated I and Q signals band-limited color difference signals $R-Y$, $B-Y$ and $G-Y$ having in practice a maximum video frequency of about 1.5 mc. and then as adding these color difference signals to the luminance signal Y extending from zero to 4 mc. The result of the addition is then in each matrix a set of low frequency voltages, zero to 1.5 mc. in extent, representing changes in the amount of one primary color, and a set of high frequency voltages, 1.5 to 4 mc. in extent, representing changes in total luminance.

The invention does not therefore, as have certain systems heretofore proposed, present in the scanning of a line of the picture tube changes in the amount of a single primary color only. The brightness detail, i.e. the fine detail of pictures reproduced according to the invention is therefore quite as good as that obtainable in three-gun tubes. Neither is there important loss of color detail. It has been determined experimentally that the finest color detail which the eye can distinguish is that presented by variations in color disposed along the orange-cyan axis of the chromaticity diagram and that even in these colors detail finer than that corresponding to video frequencies of about 1.5 mc. is not distinguishable. This limit represents a coarseness about three times as great as that of the smallest picture element (change from maximum to minimum luminance) which can be conveyed by the maximum 4 mc. video signal provided for in both black and white and color television according to the standards in force in the United States.

On the assumption that the height of a scanned line in the raster is approximately equal to one such minimum horizontal picture element, it is seen that the vertical cycle of three lines within which according to the three-line color change cycle of FIG. 1 any one color is repeated corresponds to a geometrical detail of three horizontal picture elements and hence to the maximum color resolution provided for even horizontally in the NTSC system.

Color pictures displayed according to the invention as thus far described may however exhibit a coarser horizontal line structure than do pictures in which the color of presentation is changed a large number of times during one line scan, possibly due to the unequal luminance contribution of the three primaries even to the reproduction of white. Under these circumstances adjacent scanning lines, though not resolvable by the eye in terms of differences in color may under certain circumstances be resolvable in terms of luminance since each line possesses throughout its extent the luminance of one primary for the color being synthesized. Thus for white subject matter green lines are twice as bright as red and red are three times as bright as blue.

To minimize such horizontal line structure the thickness or vertical dimension of the lines is according to a preferred form of the invention increased by the application to the electron beam in the picture tube of a supplementary deflection operating transversely to the direction of line scan and at a frequency which is high compared to the line scanning frequency.

For the application of this supplementary deflection the receiver of FIG. 2 includes an oscillator 46 and a pair of supplementary deflection coils 48 energized thereby. The axis of coils 48 should be transverse to the direction of line scan. A suitable frequency for the oscillator 46 is of the order of 16 mc., giving something like 800 cycles of deflection to the beam during a single line trace.

The amplitude of this oscillation or "wobble" of the beam transverse to the length of the lines may be adjusted for optimum effect. Preferably however the amplitude is such as to bring adjacent lines of the same color in a complete frame to juxtaposition with each other or nearly so.

The color change sequence or cycle illustrated in FIG. 1 has the advantage of eliminating line crawl by virtue of the fact that it includes a number of lines which is an integral factor of the total number of lines in the frame, so that automatically each positional line in the raster is always displayed in the same color. Color change sequences of five and seven lines also have this property, and may be used pursuant to the invention.

Figure 3:
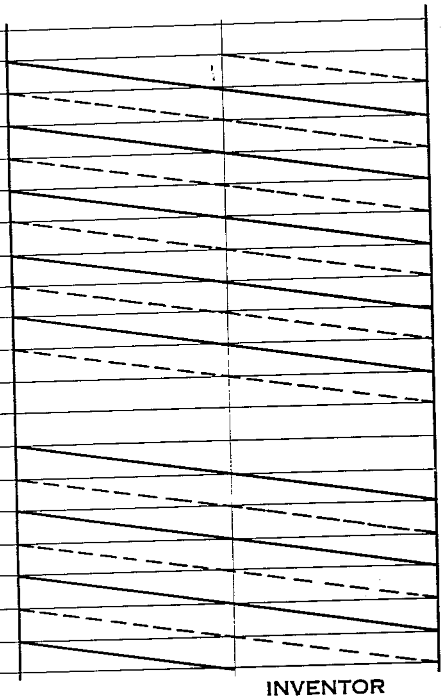
FIG. 3 is a diagram similar to that of FIG. 1 but illustrating another scanning and color sequence according to the invention.

The invention is not however restricted to such color change sequences. FIG. 3 is a diagram illustrating a four-line color change cycle. In FIG. 3 the same column headings apply as in FIG. 1. For reasons to be stated presently the cycle contains twice as many green lines as red, i.e. two green lines and one red line. A "green" line of course means a line throughout the scanning of which the beam is deflected, as by means of the switching grid 36 in FIG. 1, to impact green phosphor areas only, and throughout the scanning of which the intensity modulation of the cathode-ray beam is of green information only except for the high frequency "white" information applied to all the lines.

Since however four is not an integral factor of 525 which contains one hundred and thirty-one four-line cycles and one remainder line, the last line of any one frame will be scanned in the color, and receive the modulation of, the line in the color sequence cycle which was applied to the first positional line of the raster. Hence the lines of the raster will be rendered in different colors on succeeding frames, and the resulting picture will be subject to crawl.

According to one feature of the invention however when the length of the color change cycle in lines is a non-integral factor of the number of lines in a frame, the luminance of all the lines is equalized, so far as practicable, by increasing the number of lines in the cycle presented in colors of high luminance by comparison with those of low luminance, and by reducing the amplitude of the video signals applied during the scanning of the lines in the colors so increased in representation as required to preserve a white raster when the same video content is applied to all lines. It may be recalled that the contributions of the red, green and blue primaries of the NTSC system to the luminance of white are related as 30:59:11.

With a four-line sequence the feature of the invention now under consideration is realized by including in each color change cycle twice as many green lines as red and, approximately, by dividing the green video signal amplitude by a factor of two.

The receiver of FIG. 2 may be constructed to operate with the four-line or other non-integrally related color change sequences pursuant to the feature of the invention under discussion. For presentation of the four-line sequence of FIG. 3 the keyer 28 is arranged to develop for the gates 22, 24 and 26 waveforms as shown at F, G and H in FIG. 5, and the switcher 40 develops a step-shaped voltage as shown at waveform I.

Figure 4:
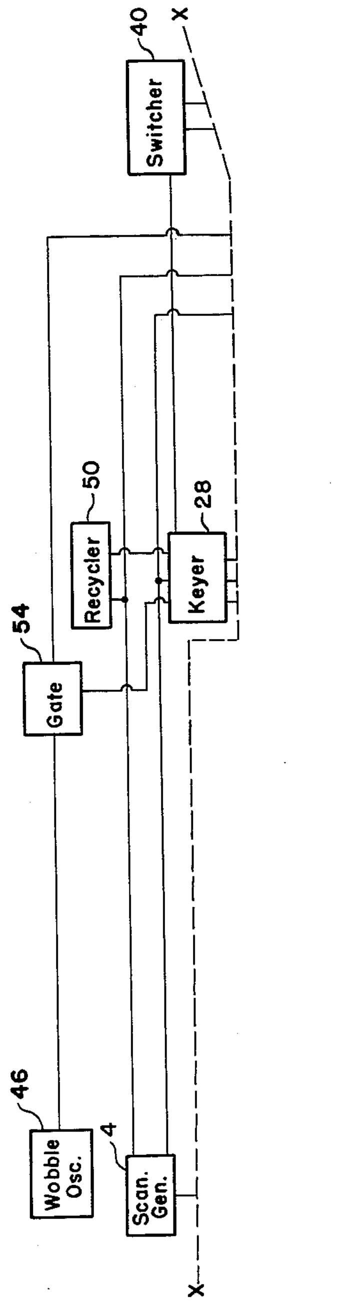
FIG. 4 is a block diagram showing components of a television receiver which, together with the components shown below the dash line X—X in FIG. 2, form a television receiver particularly adapted to reproduction of color television pictures in accordance with the scanning and color sequence of FIG. 3.

According to still another feature of the invention, each line in the raster is presented in the same color on all frames despite the use of a color change cycle not integrally related to the number of lines in a frame. FIG. 4 when taken in conjunction with the components of FIG. 2 below the dashed line X—X illustrates in block diagram form a receiver according to this feature of the invention, capable of presenting a color television signal according to the four-line color sequence shown in FIG. 3.

The receiver of FIG. 4 contains a recycling unit 50 which receives an input signal at field frequency from the scanning generator 4 and which delivers to the keyer 28 a signal at frame frequency. It is apparent from waveforms A–D and F–H of FIG. 5 that, whatever the length of the color change cycle, the aggregate output of the keyer is cyclical in the color change cycle. Indeed it must be since the keyer in a sense generates the color change cycle. In the embodiment of FIG. 4 the recycling unit 50 receives the vertical scanning waveform from the scanning generator and derives therefrom a signal which, at the end of alternate fields, is delivered to the keyer to restore the latter to a selected initial phase of the color change cycle so that the first line of each frame will be scanned in the color associated with that phase of the color change cycle. The instantaneous phase of the keyer in the color change cycle may be indicated for example by means of a counter provided therein, the counter being reset to zero at the end of the frame. In FIG. 5 waveform J represents the output of such a counter for the four-line sequence of FIG. 3. At the right hand in FIG. 5 waveforms F–J are shown as they appear on the 523d, 524th and 525th lines of a frame, and in the succeeding line which is the first line of the following frame. The waveforms are seen to undergo a discontinuity at this changeover.

FIG. 4 illustrates still another feature of the invention applicable to color change cycles in which unequal numbers of line periods are allotted to the three colors, the cycle of FIG. 3 being an example thereof. As can be seen from FIG. 3, when unequal numbers of line periods are allotted to the various primary colors, the separation, in a raster as scanned through a complete frame, of adjacent lines of the same color is in general unequal for the various colors. With the RGBG sequence of FIG. 3, pairs of adjacent green lines are spaced alternately by zero and by two intermediate lines of other colors, and pairs of adjacent red and blue lines are spaced by two and alternately by four intermediate lines of other colors. Optimum compensation for horizontal line structure may under these conditions call for selective amplitude wobbling of the lines, according to the color and position thereof in the color change cycle. To this end the output of the wobble oscillator is passed through a variable gate 54, controlled by signals from the keyer. This feature may be employed whether or not recycling of the color change cycle is employed at the start of each frame.

The receiver of the invention has been shown in block diagram form inasmuch as circuits which are individually known may be employed to perform the functions indicated. For simplicity various components have moreover been omitted from FIGS. 2 and 4, for example the D.C. restorers, the sound channel and various amplifiers for adjusting gain levels throughout the receiver.

While FIG. 2 shows a receiver operating with I and Q demodulation, the invention is of course applicable to so-called narrow band reception in which the chrominance demodulation is performed on R—Y and B—Y axes instead.

The invention may also be practiced with color change cycles other than those shown by way of example in FIGS. 1 and 3. For example a seven-line sequence may be employed. This has the advantage of being integrally related to the total number of lines in the frame and also of permitting nearly complete equalization of the luminance of all lines by the use of four green, two red and one blue line therein.

It is not to be inferred from FIG. 2 that for the purposes of the invention, when picture tubes of the type there illustrated are employed, the direction of line scan must be transverse to the length of the strips. Such a transverse relation is however advantageous in minimizing a moiré pattern in the reproduced picture. Indeed the invention is not limited to one-gun picture tubes of any particular type; it may also be practiced with one-gun picture tubes of the shadow mask type in which the gun is spun for color selection to approach the mask from plural angles. Moreover the invention may be practiced, so far as concerns the receiving station, with display devices other than cathode-ray tubes.

According to a further aspect of the invention (which may be used in conjunction with the other features of the invention already mentioned) the development, over intervals which are integral multiples of one line scan, of low frequency information in one color and high frequency information in a weighted sum of all primary colors used, is advanced from the receiver to the transmitter. In television systems employing this feature of the invention the transmitted signal comprises a carrier modulated with high frequency components representative of the total luminance in the scene televised and, throughout the scanning of any one line, further modulated with low frequency components representative of the luminance of one primary color only. A television system of this type is illustrated in block diagram form in FIG. 6 where the elements to the left of the line X—X' belong to the transmitter and those to the right belong to the receiver.

Figure 6:
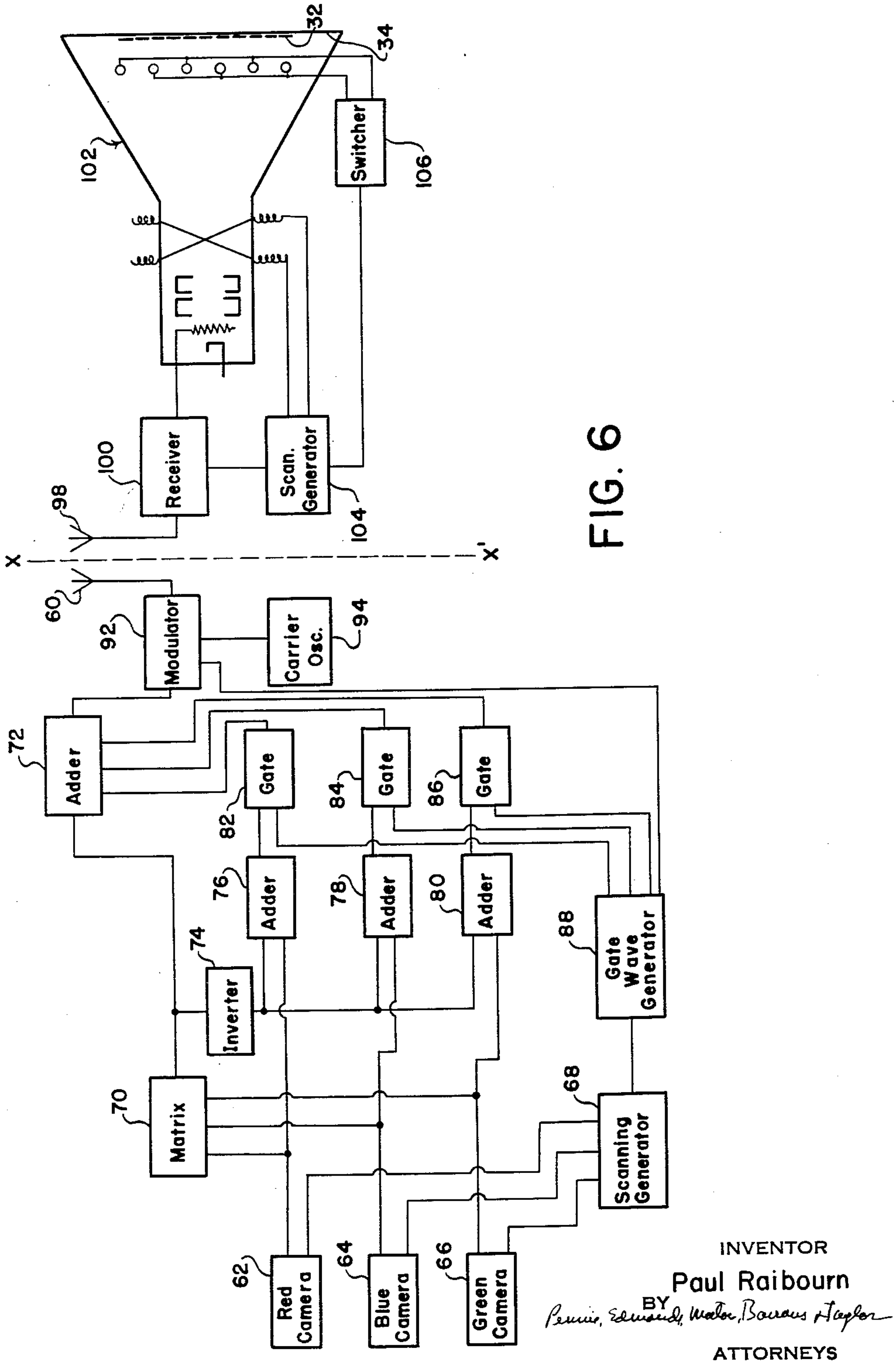
FIG. 6 is a block diagram of a complete color television system according to the invention including transmitter and receiver.

The transmitter of FIG. 6 develops for radiation at an antenna 60, or for transmission over a suitable transmission line, a radio frequency carrier carrying a modulation the color content of which is changed line by line in the scanning pattern employed. The transmitted signal is not however simply the output of a color camera responsive for one line to the red content of the scene being televised and responsive for the next line to the green content and so on. Instead means are provided whereby the scene is continuously and simultaneously surveyed in all of the primary colors of the system employed to generate continuously and simultaneously three (in practice) continuous wide band "monochromatic" video signals each representative, over the full range of video frequencies provided for in the channel allotted to the system, of one of the three primary colors of the additive color composition system employed. For the television channels now established this means a range of video frequencies extending from about 60 c.p.s. to 4 megacycles (hereinafter referred to as 0–4 megacycles).

For this purpose there are employed in the embodiment of FIG. 6 three color cameras 62, 64 and 66 responsive respectively to the red, green and blue content of the scene being televised. There is shown at 68 a scanning generator developing line and scan voltages for application to each of the cameras 62, 64 and 66 according to a scanning pattern which may conveniently be the 525 line 2:1 interlace pattern of 30 frames per second used in the United States in black and white television. Since no subcarrier signal is involved in the system now under consideration, the scanning standards may indeed be identical with those of black and white television as hitherto practiced. They may however also be quite unrelated thereto.

Cameras 62, 64 and 66 are accordingly operated to develop, in the scanning pattern employed, the three separate 0–4 megacycle color video signals above mentioned.

Suitable proportions of the video outputs of cameras 62, 64 and 66 are combined in a matrix unit 70 to develop a total luminance signal Y also extending from 0–4 megacycles, the proportions for the primaries of the NTSC system being 59 green to 30 red to 11 blue. The luminance signal Y developed in matrix 70 is fed to an adding circuit 72. It is also developed in opposite polarity in an inverter circuit 74 whose output is applied to separate adders 76, 78 and 80 to which the video signals of cameras 62, 64 and 66 are also separately applied. Adders 76, 78 and 80 accordingly develop 0–4 megacycle color difference signals which may be identified respectively as $R-Y$, $G-Y$ and $B-Y$.

These color difference signals are applied respectively to circuits 82, 84 and 86 each of which performs the function of a gate and low pass filter, passing for example color video voltages from 0–.5 or 0–1.5 megacycles although other band-limiting frequencies may of course be selected, which need not be the same in the three gates.

Each of the gates 82, 84 and 86 is opened for the duration of one line scan by means of signals from the scanning generator 68. The three gates are opened in a specified sequence which may be any of the sequences already discussed with reference to FIGS. 1–5, such a sequence and the consequent gating signals to circuits 82, 84 and 86 being specified by a gating waveform generator 88. Indeed, on some color change sequences one or more gates may, during one color change cycle, be opened for two or some other small integral number of line scanning periods in excess of one.

The successively occurring outputs of gates 82, 84 and 86 are applied to the adding circuit 72 where they are added as they appear to the 0–4 megacycle luminance signal Y from matrix 70. Adder 72 thus develops the total video signal of the transmitter which is combined in a modulator 92 with a radio frequency carrier developed in oscillator 94. Picture synchronizing signals, which may include a color phasing burst, are also applied to modulator 92, for example from generator 88.

The radiated signal is hence a carrier modulated with a single band of video frequencies extending from 0–4 megacycles for example. The low frequency components of this modulation band are during the scanning of any one line representative exclusively of the contribution of one of the primary colors to the luminance of the portion of the scene being televised represented by that line while the high frequency components are during the scanning of all lines representative of the combined luminance of all three primaries, combined in suitable proportions as aforesaid.

The receiving apparatus of FIG. 6 has the advantage of great simplicity. It comprises a receiver unit 100 which may be very similar to the black and white television receivers now in use with respect to all components between the antenna 98 and the last stage of video amplification. The total video signal recovered is applied to the display device—in FIG. 6 to an intensity controlling electrode of a cathode-ray tube 102 which may be identical with the cathode-ray tube 30 of FIG. 2. Associated with the receiving unit 100 there is provided a scanning generator 104 much like those of conventional black and white television receivers. The voltages developed by the generator 104 scan the single electron beam of tube 102 to develop a raster with the same scanning pattern as that used in cameras 62, 64 and 66, i.e. 30 frames per second each of 525 lines scanned in two interlaced fields. For the selection of the correct colors at line intervals the receiver additionally includes a switching circuit 106 which may be similar to the switching circuit 40 of FIG. 2 and which is controlled by the scanning generator 104. The switcher 106 therefore develops a waveform of the type shown at E and J in FIG. 5 and of shape suitable to the color change sequence specified by the gating wave generator 88 at the transmitter.

In order to insure correct phasing of the switching waveform of switcher 106 with respect to the color change cycle inhering in the color distribution of the low frequency components of the modulation received at the receiving station, a supplementary phasing signal may be provided at the transmitter, occurring once per color change cycle, and the receiver may incorporate suitable means responsive to this phasing signal for locking the switcher 106 into appropriate synchronization. For example, the gate wave generator 88 might include components to develop a short burst of oscillations on the back porch of the line synchronizing pulse which leads the first red line in the color change cycle, say, this modified synchronizing pulse being included in the total synchronizing signal applied to modulator 88. The apparatus at the receiving station will then of course include components necessary to extract this burst of oscillations and to synchronize the switcher 106 by means thereof.

While the invention has been described in terms of a three-color additive system, it is of course not in any of its aspects restricted to a three-color system nor to any particular set of primary colors.

I claim:

A color television receiver for display of television signals of the color sub-carrier type including a luminance component occupying a wide band of video frequencies and two chrominance components occupying lower ranges of video frequencies within said band, said receiver comprising means to extract said signals from a modulated radio frequency carrier wave, means to develop from said extracted signals in each of a plurality of channels, one for each of the primary colors employed in said signals, a signal representative over one of said lower ranges of the luminance of one of said colors in the scene being televised and representative over the remainder of said band of the aggregate luminance of all of said primary colors in said scene, a color picture tube having an electron gun adapted to generate a beam of cathode rays and having a screen in the path of said beam, said screen including a plurality of areas luminescent upon electron impact in each of said colors, means to scan with said beam a raster of lines and frames on said screen, means to supplementarily deflect said beam to areas of said screen luminescent in any one of said primary colors irrespective of the position of said beam in said raster, separate gating means coupled between each of said channels and an intensity modulation electrode of said tube, means to open said gates successively for line scan periods in a cycle including an integral number of line scans, and recycling means to cause a given one of said gates to be opened during the scanning of the first line in each frame.

References Cited in the file of this patent

UNITED STATES PATENTS

| | | |
|---|---|---|
| 2,577,368 | Schulz et al. | Dec. 4, 1951 |
| 2,671,129 | Moore | Mar. 2, 1954 |
| 2,680,147 | Rhodes | June 1, 1954 |
| 2,723,304 | Antranikian | Nov. 8, 1955 |
| 2,734,940 | Loughlin | Feb. 14, 1956 |
| 2,744,952 | Lawrence | May 8, 1956 |
| 2,745,899 | Maher | May 15, 1956 |
| 2,862,998 | Bradley | Dec. 2, 1958 |
| 2,863,939 | Jones | Dec. 9, 1958 |

OTHER REFERENCES

Color TV, Rider, pub. March 1954, pp. 141, 142.

Design Techniques for Color TV Receivers, Electronics, February 1954, pp. 136 to 143.